United States Patent [19]

Luke et al.

[11] 4,449,296
[45] May 22, 1984

[54] METHOD OF FORMING ELECTRIC DISTRIBUTION PANEL

[75] Inventors: Roger D. Luke, Norcross; John M. Rhodes, Atlanta, both of Ga.

[73] Assignee: Siemens-Allis, Inc., Atlanta, Ga.

[21] Appl. No.: 104,101

[22] Filed: Dec. 17, 1979

Related U.S. Application Data

[63] Continuation of Ser. No. 920,153, Jun. 29, 1978, abandoned.

[51] Int. Cl.³ .............................................. H01R 43/00
[52] U.S. Cl. ....................................... 29/883; 361/338
[58] Field of Search ............... 29/883, 884; 339/21 R, 339/198 N; 361/363, 353, 350, 346, 361, 338

[56] References Cited

U.S. PATENT DOCUMENTS

| | | |
|---|---|---|
| 1,914,074 | 6/1933 | Bruijnes et al. . |
| 2,131,884 | 10/1938 | Brodhecker . |
| 2,170,299 | 8/1939 | Frank . |
| 2,192,899 | 3/1940 | Edmonson . |
| 2,332,766 | 10/1943 | Von Gehr . |
| 2,466,566 | 4/1949 | Tiscione . |
| 2,924,804 | 2/1960 | Frank et al. . |
| 3,119,051 | 1/1964 | Norden ............................ 361/363 |
| 3,346,776 | 10/1967 | Olashaw ............................ 361/338 |
| 3,855,504 | 12/1974 | Olashaw ............................ 361/342 |
| 3,858,092 | 12/1974 | Olashaw et al. . |
| 4,118,754 | 10/1978 | Duggan ..................... 339/198 N X |
| 4,137,424 | 1/1979 | Hesse et al. ................. 339/21 R X |

FOREIGN PATENT DOCUMENTS 1010545 5/1977 Canada .
1304686 1/1973 United Kingdom ............ 339/21 R

OTHER PUBLICATIONS

Gould Speedfox Catalog, (Oct. 1977), p. 110.

Primary Examiner—Howard N. Goldberg
Assistant Examiner—Carl J. Arbes
Attorney, Agent, or Firm—Frederick W. Powers

[57] ABSTRACT

An electric distribution panel is constructed with an insulating base formed by extrusion. Also extruded with the base are two rows of circuit breaker mounting ledges, hook formations for each of the mounting ledges to mechanically secure circuit breakers at the load ends thereof, and channel defining formations to slidably receive neutral bars disposed outboard of each of the mounting ledges. A tie bar extends transverse to the neutral bars and provides an electrical connection therebetween. Wiring guide elements are slidably received by appropriate formations of the base and in particular the base is provided with elongated apertures to receive annular embossments of one of the wiring guides elements so as to permit expansion of the base without buckling thereof even though the mounting surface for the distribution device does not expand at the same rate as the base.

3 Claims, 7 Drawing Figures

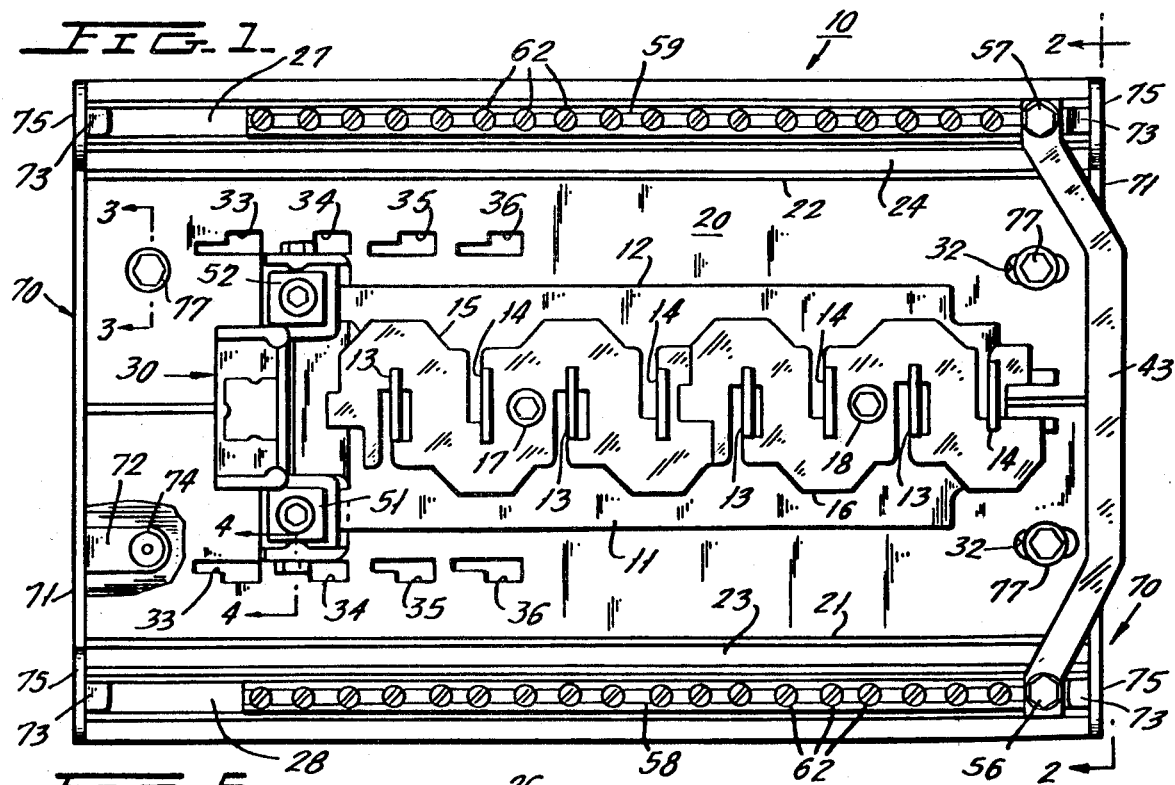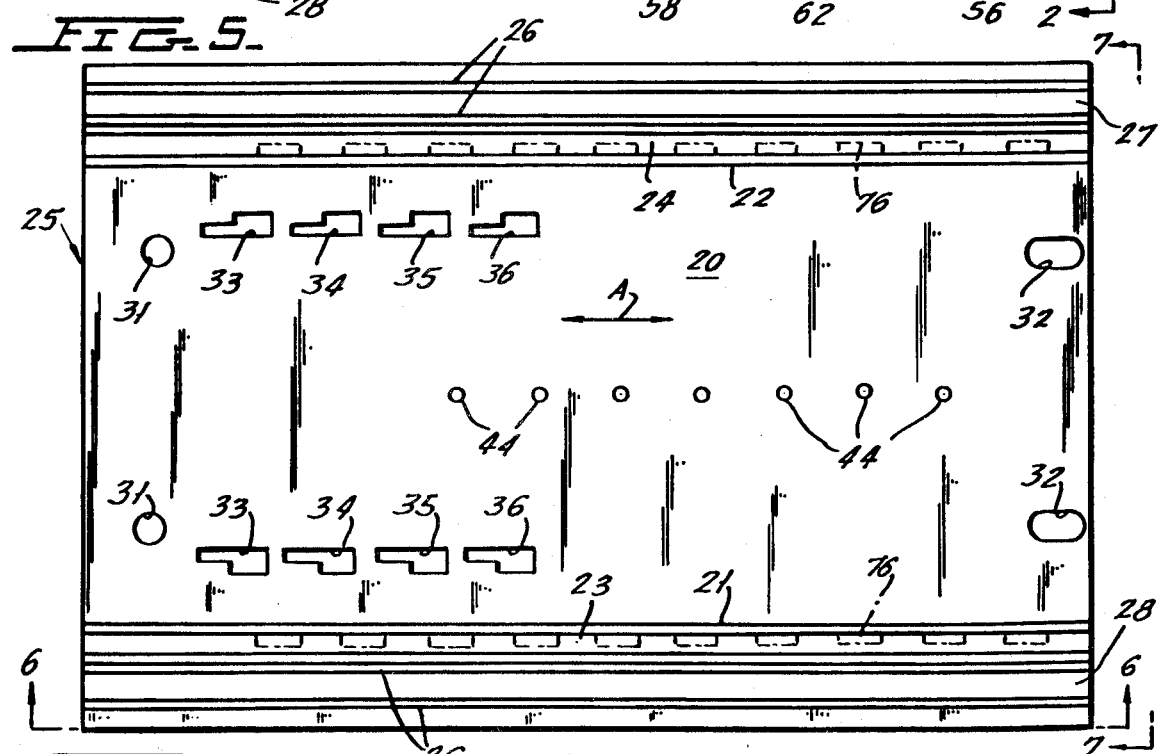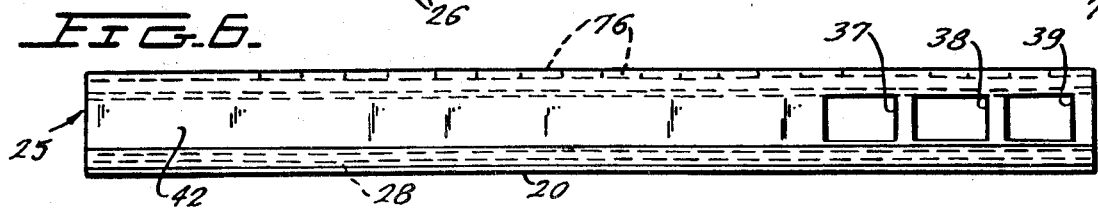

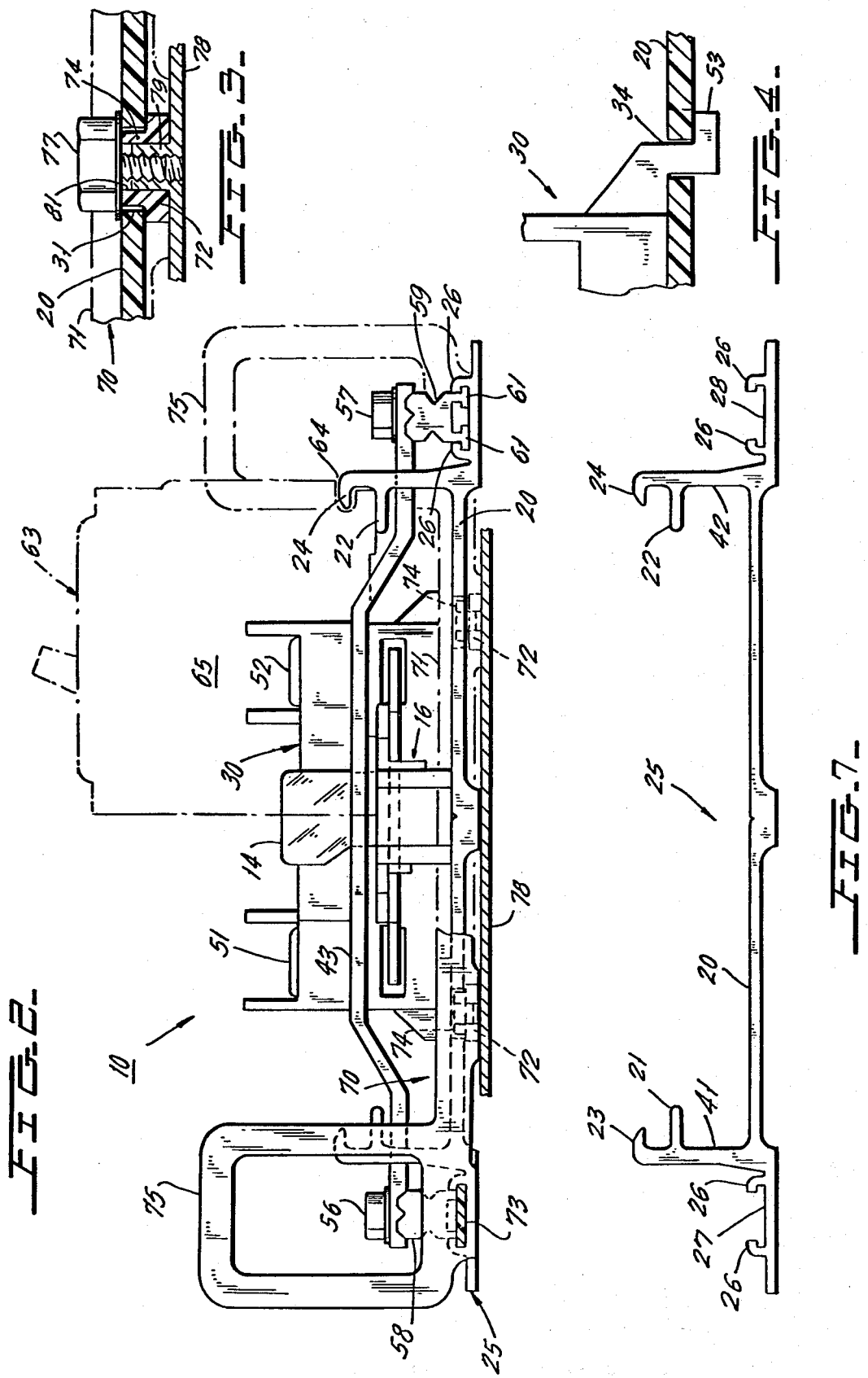

4,449,296

METHOD OF FORMING ELECTRIC DISTRIBUTION PANEL

This is a continuation of U.S. Pat. Application Ser. No. 920,153, filed June 29, 1978 now abandoned.

This invention relates to devices for the distribution of electrical power and more particularly relates to panelboards for home and light industrial applications.

The concept of utilizing a single insulating element to perform multifunctions in the construction of electrical panelboards appears to be promising insofar as cost reduction for material and/or labor. The typical prior art approach has been to utilize molded plastic elements to perform multiple functions. One of these prior art designs is disclosed in the copending U.S. Application Ser. No. 772,442 filed Feb. 28, 1977, by J. E. Duggan for an Electrical Panel Having Molded Base Pan, which issued Oct. 3, 1978 as U.S. Pat. No. 4,118,754. The device of the aforesaid Duggan application is produced by utilizing injection molds. Initially the cost of these molds is very expensive and the cost of making changes to the mold is also very expensive. Further, it is not possible to utilize a single injection mold for many different sizes of panels.

In order to overcome the foregoing difficulties of the prior art, the instant invention provides a panelboard construction wherein the base and many major elements are formed integrally with the base by extruding a plastic insulating material.

The material in question is relatively thin and flexible yet the overall device is relatively rigid because of interconnections of the conducting elements, such as the main bus bars, a pair of elongated neutral bars and a connecting bar extending generally transverse to the neutral bars, directly with one another and/or to the base. Molded wiring guides slip into retaining formations in the base. The wiring guides include tabs having apertures for locating the device on a mounting surface and also permit one end of the base to "float" relative to this mounting surface.

Accordingly, a primary object of the instant invention is to provide a novel panelboard construction which is relatively inexpensive to manufacture.

Another object is to provide a panelboard in which a single extruded insulating member provides a base, circuit breaker mounting ledges, circuit breaker hook securing means, and channels which slidably receive and retain neutral bars.

A further object is to provide a novel panelboard construction wherein the production equipment may readily be changed to change the number of circuit breaker locations.

A still further object is to provide a novel panelboard construction having simplified means for the mounting of wiring guides and securement of the panelboard to a mounting surface.

These objects as well as other objects of this invention shall become readily apparent after reading the following description of the accompanying drawings in which:

FIG. 1 is a front elevation view of an electrical panel embodying the instant invention.

FIG. 2 is an end view looking in the direction of arrows 2—2 of FIG. 1.

FIGS. 3 and 4 are fragmentary cross-sections taken through the respective lines 3—3 and 4—4 of FIG. 1 looking in the directions of the respective arrows 3—3 and 4—4.

FIG. 5 is a plan view of the extruded insulating member which includes the base of the electrical panel.

FIGS. 6 and 7 are elevations of the extruded member of FIG. 5 looking in the directions of the respective arrows 6—6 and 7—7 of FIG. 5.

Now referring to the Figures. Electric distribution panel indicated generally by reference numeral 10 in FIG. 1 includes main bus bars 11, 12 having a plurality of integrally formed male stabs or line contact blades 13, 14, respectively. Insulators 15, 16 maintain clearances between bus bars 11, 12 and their respective blades 13, 14 in a manner fully described in U.S. Pat. No. 3,349,292 issued Oct. 24, 1967 to J. F. Meacham for a Load Center. Screws 17, 18 extend through insulators 15, 16 to secure bus bars 11, 12 to base 20.

The latter is the main plate-like portion of extruded insulating member 25 shown in detail in FIGS. 5-7. A suitable material for extrusion 25 is the plastic insulating material manufactured by the General Electric Company using the trademark NORYL. Extrusion 25 also includes a pair of elongated ledges 21, 22 positioned in front of base 20, a pair of mounting hooks 23, 24 mounted in front of the respective ledges 21, 22, and elongated channels 27, 28 disposed outboard of the respective hook formations 23, 24. Channels 27, 28 are very shallow and the fronts thereof are generally open, having short inwardly extending lips at the front thereof. As operations secondary to the extrusion in a direction parallel to the double headed arrow A in FIG. 5, extruded member 25 is provided with a pair of circular apertures 31 at one end thereof and a pair of elongated apertures 32 at the other end thereof for a reason which will hereinafter be seen. Four pairs of L-shaped slots 33, 34, 35, 36 are punched in base 20 for positioning main lug insulator 30 (FIG. 1) in a manner which will be described hereinafter. Three pair of rectangular apertures 37, 38, 39 (FIG. 6) are punched through each of the connecting portions 41, 42 between base 20 and the respective ledges 21, 22 for operative positioning of transverse neutral connecting bar 43, for a reason which will hereinafter be explained. Centrally located apertures 44 in base 20 are provided to receive bus bar insulator mounting screws such as 17, 18.

As seen best in FIGS. 1 and 2, line terminal stabs or contacts 13, 14 are face-to-face in a row-like array extending parallel to extrusion direction A and positioned midway between ledges 21, 22. The left ends of bus bars 11, 12, as viewed in FIG. 1, extend through clearance apertures in block 30 and are connected to the respective main terminal lug 51, 52 disposed within appropriate recesses of block 30, with the left ends of bus bars 11, 12 being adjacent to the respective lips 91, 92 of block 30 which position the respective lugs 51, 52. Block 30 is mounted to base 20 by moving outwardly extending feet 53 thereof (FIG. 4) rearward through the enlarged portions of slots 34, 34, and thereafter sliding block 30 to the left with respect to FIG. 1 so that feet 53 are captured behind portions of base 20 (FIG. 4). Now base 20 blocks forward and rearward movement of block 30 and also prevents movement thereof to the left with respect to FIG. 1. The connections between lugs 51, 52 and bus bars 11, 12 prevent movement of block 30 to the right with respect to FIG. 1.

Connecting bar 43 is a rigid conducting member having a main central section and rearwardly offset ends which are connected by screws 56, 57 to the respective neutral bars 58, 59. The latter are mounted in channels 27, 28 being captured therein by lips 26 which are positioned in front of outward protrusions 61 at the rear of each of the neutral bars 58, 59. The ends of connecting bar 43 extend through aligned apertures 39, 39 so that connecting portions 41, 42 of extrusion 25 prevent movement of connecting bar 43 and neutral bars 58, 59 connected thereto to both the left and right with respect to FIG. 1. In a manner well known to the art each neutral bar 58, 59 is provided with a plurality of apertures for receiving wires and each of these apertures has entered therein a wire gripping screw 62 to retain the wire (not shown) connected to the neutral bar 58, 59. It is noted that each of the neutral bars 58, 59 extends parallel to the extrusion direction A and there are sufficient wire receiving apertures so that a neutral connection may be made in the close vicinity of the load connection to a particular circuit breaker 63 mounted to device 10. Circuit breaker 63 does not form any part of the instant invention but is merely of a type well known to the art which is shown in FIG. 2 as having its load end supported on ledge 22 and being retained by hook formation 24 which extends into transverse slot 64 which extends the full width of circuit breaker housing 65. For the utilization of circuit breakers which do not have hook receiving recesses open at both ends, as a secondary operation portions, such as those indicated by reference numeral 76 and shown in phantom in FIGS. 5 and 6, are cut from hook means 23, 24 to form a plurality of discrete relatively narrow hooks. In a manner well known to the art the lower left portion of circuit breaker 63 shown in FIG. 2 is provided with a female line terminal which frictionally engages one of the contacts in the array 13, 14.

Mounted to the ends of extruded member 25 are identical wire guide elements 70 each constructed of insulating material. Element 70 includes connecting rod 71 having a pair of tabs 72 extending transversely therefrom in the extrusion direction A. Disposed outboard of tab 72 are a pair of ears 73 which extend into the ends of channel 27, 28. Tabs 72 extend behind base 20 and forward embossments 74 on tabs 72 near the free ends thereof, extend through either base apertures 31 or 32 depending upon which end of base 20 the particular guide element 70 is mounted. Rectangular formations at the ends of rod 71 form post 75 which are aligned with neutral bars 58, 59 extending considerably more forward than mounting hooks 23, 24. In a manner well known to the art, the four posts 75 define an area through which wires are not to be run.

The diameter of each base aperture 31 is only slightly greater than the diameter of embossment 74 (FIG. 3). In order to mount panel 10 to a support, such as the rear wall 78 of an enclosure (not shown), panel 10 is located on wall 78 by four extrusions 79 each of which extends forward from wall 78 into an individual aperture 81. The latter extends through tab 72 and is centrally located with respect to embossment 74. Extrusion 79 is provided with a threaded central aperture which receives the threaded portion of shoulder screw 77 whose head abuts base 20. The cooperation of annular embossments 74 disposed within elongated base apertures 32 permits substantial differential expansion and contraction of base 20 relative to mounting wall 78 without buckling of base 20 or unduly straining.

As seen best in FIG. 7, the sections of extrusion 25 are relatively thin so that extrusion 25 is per se relatively flexible. However, the overall panel structure 10 possesses sufficient rigidity for its intended purpose in that there are a sufficient number of relatively rigid metallic elements connected either directly or indirectly to extrusion 25. These metallic elements include neutral bars 58, 59, connecting bar 43, and main bus bars 11, 12. Molded block 30 and molded insulators 15, 16 also lend rigidity to the overall panel structure 10. The latter is further rigidified by securement to wall 78.

Utilization of extrusion techniques permits the utilization of the same dies for constructing many different size panels. That is, the extrusion cross-section of FIG. 7 is retained for many size panels. The length of the extrusion is determined by the number of circuit breaker locations desired. The number of circuit breaker locations also determines the lengths of the neutral bars and bus bars, and also determines the locations of the main terminal mounting block and the connecting bar secured to the neutral bars.

Although a preferred embodiment of this invention has been described, many variations and modifications will now be apparent to those skilled in the art, and it is therefore preferred that the instant invention be limited not by the specific disclosure herein, but only by the appended claims.

What is claimed is:

1. A method for forming an electrical power distribution device comprising the steps of:
   forming a base by extruding insulating plastic material flowing in an extruding direction;
   simultaneously forming both circuit breaker and neutral bus mounting means integrally with said base during said extrusion step, said circuit breaker mounting means extending in said extruding direction and being adapted to support circuit breakers when the latter are operatively mounted to said device, said neutral bus mounting means including first and second channels extending in said extruding direction and being adapted to slidably receive first and second neutral bus bars, respectively;
   slidably inserting said first and second neutral bus bars into said first and second channels, respectively;
   and
   securing a main bus bar having a line contact array connected thereto to the front of said base, said line contact array being adapted to engage said circuit breakers when the latter are operatively mounted to said device.

2. The method of claim 1, wherein said step of forming said mounting means includes forming first and second mounting ledges extending in said extruding direction and being located on opposite sides of said array.

3. The method of claim 2, wherein said step of forming said mounting means further includes forming hook means integrally with said base during said extrusion step, said hook means being adapted to mechanically secure said circuit breakers in their operative positions when the latter are operatively mounted to said device; said mounting ledges and said hook means being disposed in front of said base.

* * * * *